H. H. CRAIGIE.
Waste-Traps for Wash-Basins.
No. 135,206. Patented Jan. 28, 1873.
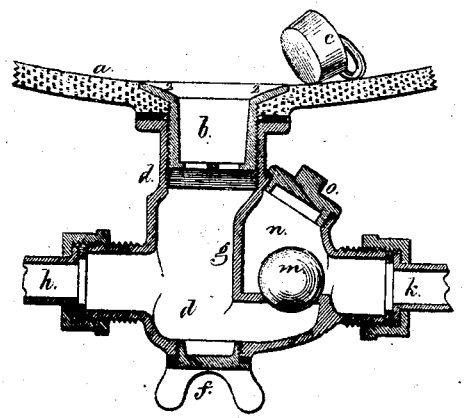
Witnesses:
INVENTOR
Hugh H. Craigie,
Per L. W. Serrell
ATTY.

UNITED STATES PATENT OFFICE.

HUGH H. CRAIGIE, OF NEW YORK, N. Y.

IMPROVEMENT IN WASTE-TRAPS FOR WASH-BASINS.

Specification forming part of Letters Patent No. 135,206, dated January 28, 1873.

*To all whom it may concern:*

Be it known that I, HUGH H. CRAIGIE, of the city and State of New York, have invented an Improvement in Waste-Traps for Wash-Basins; and the following is declared to be a correct description thereof.

In Letters Patent No. 89,858, granted to me, a trap is shown adapted to being attached directly to the wash-basin and interposed between such basin and the waste-pipe.

My present invention is an improvement upon aforesaid device; and consists in a floating valve applied at the discharge-aperture so as to close the same and prevent smell passing out of the waste-pipe in cases where the water has been siphoned out of the trap, or where the water has evaporated.

In the drawing I have represented my improvement by a vertical section.

A portion of the bottom of the basin is shown at $a$ with the ferrule $b$ screwed into the trap $d$, and having a flange, 2, for securing the same to the basin $a$. The plug $c$, coupling $h$ to the basin-overflow, coupling $k$ to the sewer-pipe, and screw-cap $f$ to the trap are substantially the same as in the before-mentioned patent, and do not require further description. The partition $g$ interposes between the sewer-pipe $k$ and the thimble or ferrule $b$, and in this is the seat for the valve $m$. This valve is free to rise in the chamber $n$, but cannot escape into the sewer-pipe $k$, being too large. Hence, when said valve rests upon its seat there is no opportunity for smell to escape from the sewer-pipe, whether the trap $d$ contains water or not. The screw-stopper $o$ gives access to the chamber $n$ for cleansing the same or the valve $m$.

I claim as my invention—

The valve $m$ within the chamber $n$, in combination with the trap $d$ and screw-ferrule $b$, substantially as and for the purposes set forth.

Signed by me this 1st day of June, A. D. 1872.

H. H. CRAIGIE.

Witnesses:
GEO. T. PINCKNEY,
CHAS. H. SMITH.